(12) United States Patent
Yang et al.

(10) Patent No.: US 7,270,577 B2
(45) Date of Patent: Sep. 18, 2007

(54) CONNECTOR MODULE AND MOTOR UTILIZING THE SAME

(75) Inventors: Chun-Hua Yang, Taoyuan Hsien (TW); Jin-Juh Hsu, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 0 days.

(21) Appl. No.: 11/180,701

(22) Filed: Jul. 14, 2005

(65) Prior Publication Data

US 2006/0040528 A1 Feb. 23, 2006

(30) Foreign Application Priority Data

Aug. 18, 2004 (TW) .............. 93124815 A

(51) Int. Cl.
*H02K 11/00* (2006.01)

(52) U.S. Cl. .................. 439/638; 174/50.52; 439/926; 310/71

(58) Field of Classification Search .......... 439/67, 439/77, 79, 638, 651, 655, 926; 310/71; 174/50.52

See application file for complete search history.

(56) References Cited

U.S. PATENT DOCUMENTS

| 3,082,350 | A | * | 3/1963 | Gulbrandsen | 313/318.05 |
| 3,264,599 | A | * | 8/1966 | Kinkaid | 439/374 |
| 3,440,592 | A | * | 4/1969 | Zelle | 439/108 |
| 3,878,489 | A | * | 4/1975 | Rothweiler | 335/199 |
| 4,180,304 | A | * | 12/1979 | Lerude | 439/76.1 |
| 4,573,104 | A | * | 2/1986 | Kamada | 361/756 |
| 4,836,792 | A | | 6/1989 | Glover | |
| 4,851,725 | A | * | 7/1989 | Keck | 310/71 |
| 4,853,568 | A | * | 8/1989 | Fujiwara | 310/68 C |
| 5,528,093 | A | * | 6/1996 | Adam et al. | 310/89 |
| 5,610,458 | A | * | 3/1997 | Baker et al. | 310/68 R |
| 5,629,574 | A | * | 5/1997 | Cognetti et al. | 310/71 |
| 5,766,026 | A | * | 6/1998 | Cooper et al. | 439/76.1 |
| 6,099,324 | A | * | 8/2000 | Janssen et al. | 439/76.1 |
| 6,099,325 | A | * | 8/2000 | Parkhill | 439/76.1 |
| 6,429,557 | B2 | * | 8/2002 | Sheeran et al. | 310/71 |
| 6,906,438 | B2 | * | 6/2005 | Ursel et al. | 310/89 |
| 6,974,351 | B1 | * | 12/2005 | Lauk et al. | 439/651 |
| 2002/0149283 | A1 | | 10/2002 | Hager et al. | |

FOREIGN PATENT DOCUMENTS

| EP | 0 551 113 A2 | 7/1993 |
| EP | 0 831 012 A2 | 3/1998 |
| JP | 5-56599 | * 3/1993 |

* cited by examiner

*Primary Examiner*—Neil Abrams
(74) *Attorney, Agent, or Firm*—Birch, Stewart, Kolasch & Birch, LLP

(57) ABSTRACT

A connector module and motor utilizing the same. The connector module electrically connects the motor and an external device and includes a printed wiring board and a plurality of pins. The printed wiring board comprises at least one circuit line, each of circuit lines has a first terminal and a second terminal opposite thereto. Each pin has a first end and a second end opposite thereto. The first terminals of the circuit lines are electrically connected to an input port of the motor. The second terminals of the circuit lines are electrically connected to the first ends of the pins separately, and the second ends of the pins are electrically connected to the external device.

16 Claims, 6 Drawing Sheets

CONNECTOR MODULE AND MOTOR UTILIZING THE SAME

BACKGROUND

The invention relates to a connector module, and in particular to a connector module applied in a motor.

Connectors comprise any connecting element and auxiliary thereof for electronic messages and external power supply. Connectors act as bridges for transferring messages, and thus, quality of the connectors affects reliability of current and message transmission and performance of the entire electronic device.

With respect to electronic devices such as motors, connectors are used as interfaces to electrically connect the motors to external devices such as external power supplies to actuate rotation of a shaft. FIG. 1A is a top view of a conventional interface used in a motor, and FIG. 1B is a side view of FIG. 1A. As shown in FIGS. 1A and 1B, at an input port of the motor 10, a printed wiring board (PWB) 13 is disposed above an opening 12 of a cover 11, and a connector 14a fixedly is installed or welded on the printed wiring board 13. A plurality of circuit lines are distributed on the printed wiring board 13 to connect the motor 10 and the connector 14a. As a result, the motor 10 is electrically connected to the external power supply via the PWB 13 and the pins 15 of the connector 14a.

There are a lot of different types of connectors used to different external devices for electrical connection and various interface specifications. However, the distance between any two adjacent pins 15, i.e. the interface pitch of each type of connector is fixed; that is, the pitch is unchangeable according to different interface specification, thus, usable range is limited.

FIG. 1C is a top view of another conventional interface used in a motor. FIG. 1D is a side view of FIG. 1C. In another design, the connector is directly installed or welded at an input port of the motor 10. That is, a connector 14b is directly disposed at an opening 12 of a cover 11. One end of the connector 14b is connected to the motor 10, and the other end of the connector 14b having a plurality of pins or longitudinal terminals 17 for connecting to external devices such as an external power supply to actuate rotation of a shaft 16. However, such design with unique specification requirements is more complicated and expensive, it may be difficult to find on the market.

In addition, FIG. 1E is a top view of yet another conventional interface used in a motor, and FIG. 1F is a side view of FIG. 1E. As shown in FIGS. 1E and 1F, the printed wiring board and complicated connector are simplified. Several pins or longitudinal terminals 17 are directly welded at an input port 19 of the motor 10. However, during a welding process, the pins or longitudinal terminals 17 are welded onto the input port 19 protruding at an opening 12 of the cover 12, but the interior of the motor 10 is exposed to outside through the opening 12. Thus, tin residue or other foreign particles may enter the interior of the motor 12 through the opening 10 during the welding process, possibly interfering with normal operation of the motor.

SUMMARY

Embodiments of the invention provide a connector module to eliminate the shortcomings of the conventional design, adaptable to different interfaces or connectors with unique specifications. Application of the connector module of the invention is simple with high flexibility, reducing costs for connectors of special specification.

Also provided is a connector module, connecting a motor and an external device, the connector module comprising a printed wiring board (PWB) and a plurality of pins. The printed wiring board comprises at least one circuit line, each of which has a first terminal and a second terminal opposite thereto. Each pin has a first end and a second end opposite thereto. The first terminals of the circuit lines are electrically connected to an input port of the motor. The second terminals of the circuit lines are electrically connected to the first ends of the pins, and the second ends of the pin are electrically connected to the external device. The motor has a cover with an opening defined thereon such that the input port penetrates the opening of the cover to electrically connect to the external device. The printed wiring board is disposed above the opening, and has a size greater than or equal to that of the opening.

Embodiments of the invention further provide a motor, electrically connected to an external device, comprising an input port and a connector module. The motor actuates an indicator of an odometer of a vehicle. The connector module comprises a printed wiring board (PWB) and a plurality of pins. The printed wiring board comprises at least one circuit line, each of which has a first terminal and a second terminal opposite thereto. Each pin has a first end and a second end opposite thereto. The first terminals of the circuit lines are electrically connected to the input port of the motor. The second terminals of the circuit lines are electrically connected to the first ends of the pins, and the second ends of the pins are electrically connected to the external device. The motor has a cover with an opening defined thereon such that the input port penetrates the opening of the cover to electrically connect to the external device. The printed wiring board is disposed above the opening, and has a size greater than or equal to that of the opening.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION

Figure 1A:
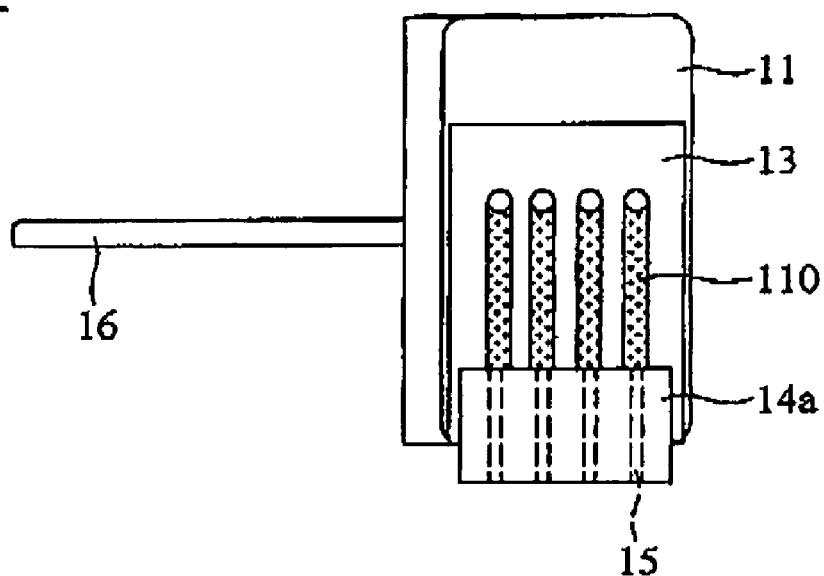
FIG. 1A is a top view of a conventional interface used in a motor.
Figure 1B:
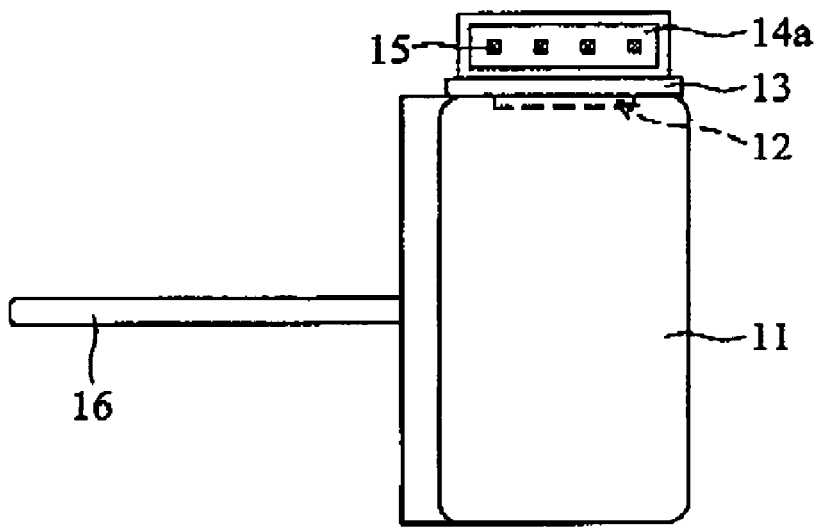
FIG. 1B is a side view of the conventional interface of FIG. 1A.
Figure 1C:
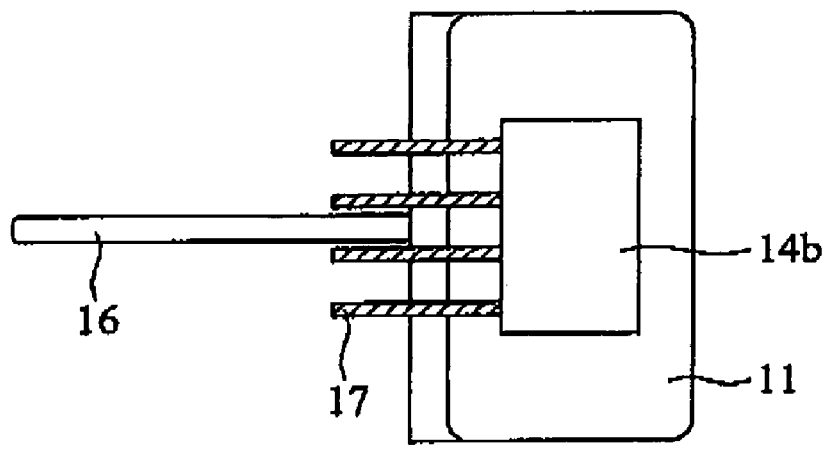
FIG. 1C is a top view of another conventional interface used in a motor.
Figure 1D:
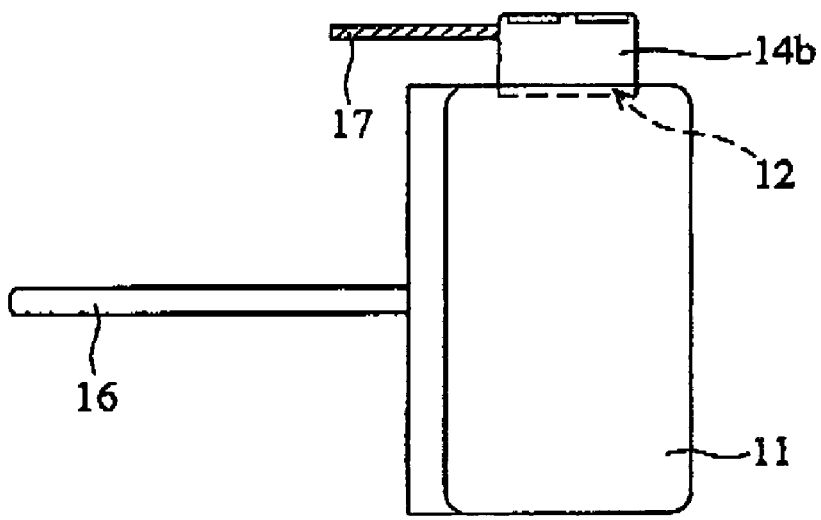
FIG. 1D is a side view of the conventional interface of FIG. 1C.
Figure 1E:
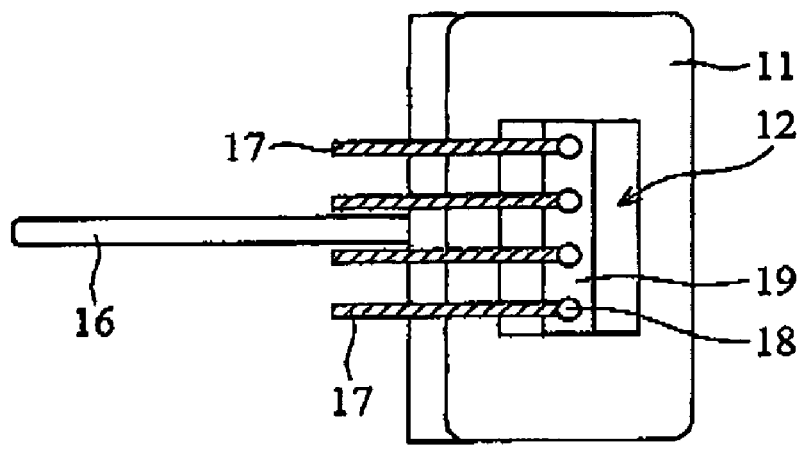
FIG. 1E is a top view of yet another conventional interface used in a motor.
Figure 1F:
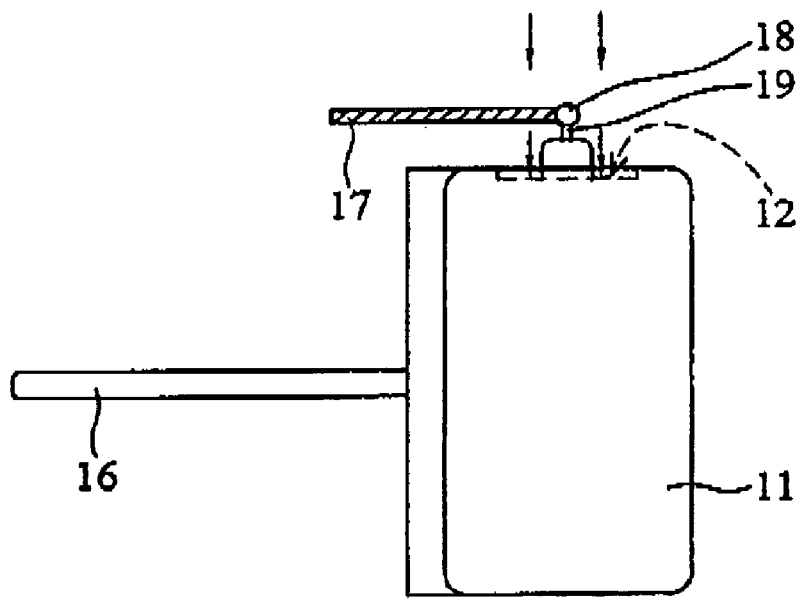
FIG. 1F is a side view of the conventional interface of FIG. 1E.
Figure 2A:
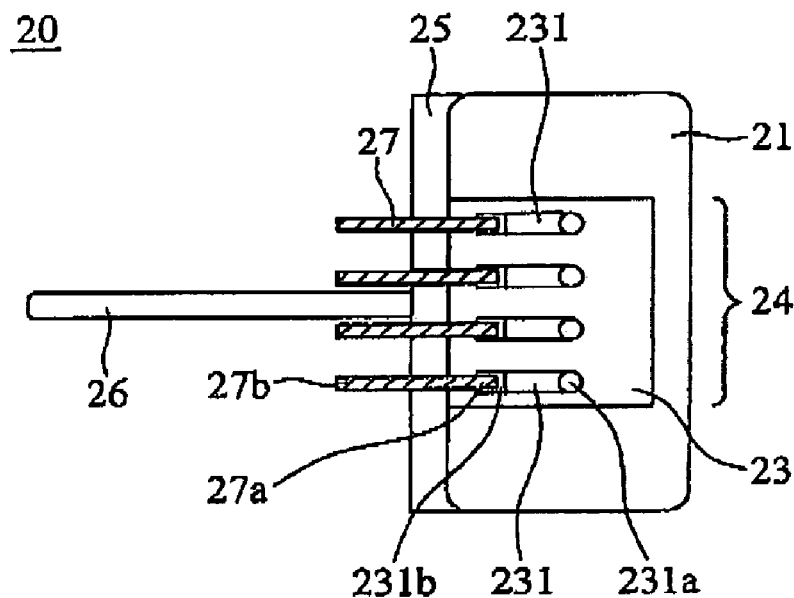
FIG. 2A is a top view of an embodiment of a connector module and a motor utilizing the same.
Figure 2B:
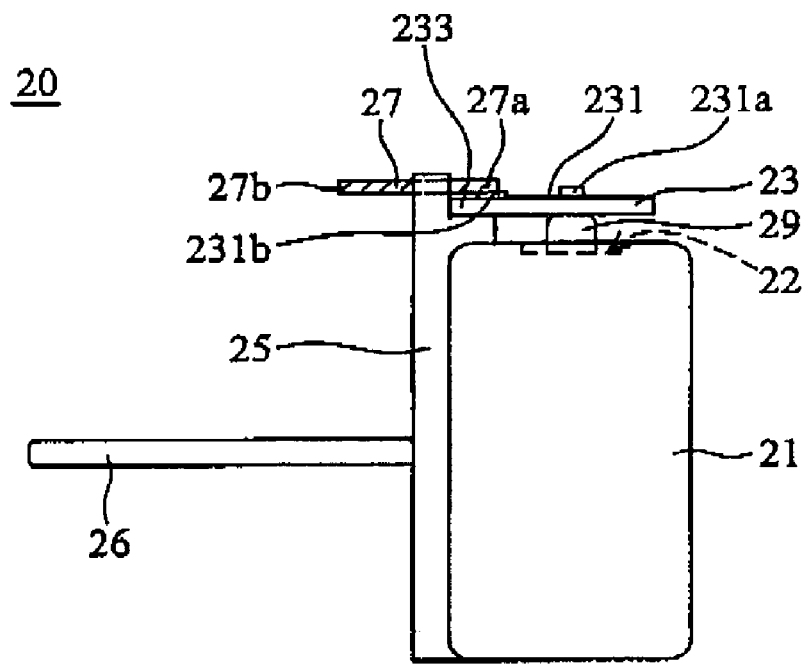
FIG. 2B is a side view of the connector module and a motor utilizing the same.

FIG. 2A is a top view of an embodiment of a connector module and a motor utilizing the same. FIG. 2B is a side view of the connector module and the motor utilizing the same. The motor 20 is connected to an external device via a connector module 24. The external device can be an external power supply to actuate rotation of a shaft 26 of the motor 20. For example, rotation of the shaft 26 can be designed to actuate an indicator of an odometer on a display of a vehicle.

The motor 20 includes an input port 29 and the connector module 24. The connector module 24 includes a printed wiring board (PWB) 23 and several pins 27 or longitudinal terminals. The printed wiring board 23, of an insulating material, includes at least one circuit line 231, each of which has a first terminal 231a and a second terminal 231b opposite thereto. Each pin 27 has a first end 27a and a second end 27b opposite thereto. The first terminals 231a of the circuit lines 231 are electrically connected to an input port 29 of the motor 20. The second terminals 231b of the circuit lines 231 are electrically connected to the first ends 27a of the pin 27 separately, and the second ends 27b of the pins 27 are electrically connected to the external device separately. Thus, the input port 29 of the motor 20 can be electrically connected to external devices via the circuit lines 231 and pins 27 on the printed wiring board 23. The external device is such as an external power supply.

The motor 20 has a cover 21 with an opening 22 therein such that the input port 29 penetrates through the opening 22 and out of the cover 21 to electrically connect to the first terminals 231a of the circuit lines 231. The invention does not limit connecting methods between the second terminals 231b of the circuit lines 231 and the first ends 27a of the pins 27. In an embodiment, the second terminals 231b and the first ends 27a can be separately connected by welding. The connecting positions of the second terminals 231b of the circuit lines 231 and the first ends 27a of the pins 27 are determined and controlled by a jig. As the result, the pitch between the pins 27 is obtained in accordance with the positions of the second terminals 231b of the circuit lines 231. Therefore, the pitch or size of the pins 27 can be adjusted according to required interfaces, varying with the position of the second terminals of the circuit lines.

The printed wiring board 23 is disposed above the opening 22, having a size greater than or equal to a size of the opening 22. Thus, the opening 22 is blocked by the printed wiring board 23. Therefore, tin residue or other foreign particles do not enter the interior of the motor 12 during a welding process.

Figure 3:
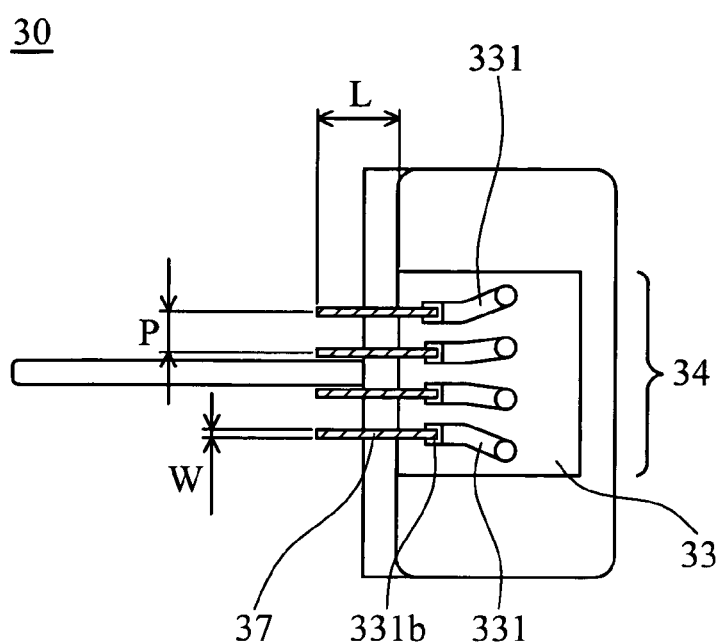
FIG. 3 is a top view of another embodiment of a connector module and a motor utilizing the same.

FIG. 3 is a top view of another embodiment of a connector module and a motor utilizing the same. As external devices change, positions of the second terminals of the circuit lines can be modified according to the required interfaces for adapting different connectors. Thus, the invention can be easily applied with flexibility.

As shown in FIG. 3, a motor 30 is connected to an external device via a connector module 34. In this embodiment, the interface specification of the external device connected to the motor 30 is different from that of the other external device connected to the connector module 34. Thus, positions of the second terminals 331b of the circuit line 231s are separately adjusted in according to the requirements such that the pitch "P" between the pins 37 is able to conform to the external device. That is, layout on the printed wiring board can be changed by modifying the pitch between pins 37, length L, and width W of the pins 37 such that different interfaces can be efficiently achieved, providing flexible space in the connector modules 24 and 34 and the invention is in widespread use.

Figure 2C:
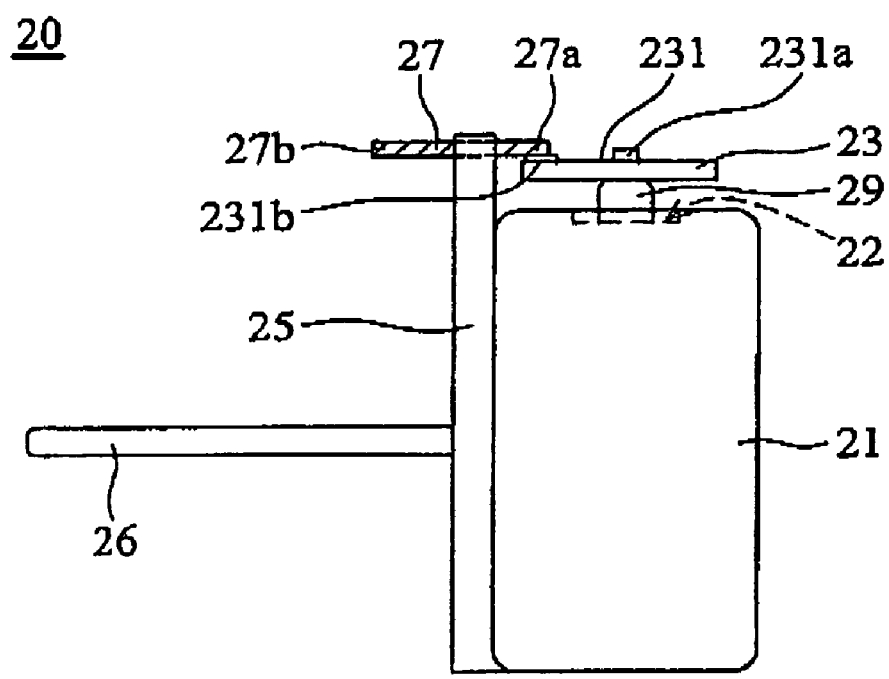
FIG. 2C is a side view of another embodiment of the connector module and a motor utilizing the same.

Moreover, the motor 20 further includes a supporting portion 25, as shown in FIGS. 2A and 2B. The shaft 26 passes through a center of the supporting portion 25, and the supporting portion 25 acts as a bottom portion of the motor cover 21. The supporting portion 25 includes an insulating material, such as plastic. Moreover, the supporting portion 25 extends outwardly such that the edge 233 of the printed wiring board 23 abuts the supporting portion 25, and the supporting portion 25 can support the printed wiring board 23 and allow the pins 27 to penetrate therethrough. As a result, the pins 27 are positioned on the printed wiring board 23. Alternatively, the printed wiring board 23 may not contact with the supporting portion 25, as shown in FIG. 2C. The printed wiring board 23 is disposed on the input port 29 of the motor and the second terminals 231b of the circuit lines 231 are connected with the first ends 27a of the pins 27. respectively. Also, the supporting portion 25 allows the pin 27 to penetrate therethrough and the pins 27 are positioned on the printed wiring board 23. Because the pins penetrate through the supporting portion 25, it helps the pins to be firmly and more stably positioned on the printed wiring board 23.

In conclusion, the connector module including a printed wiring board and pins is designed in a simple structure to substitute for conventional connectors. The pins and the printed wiring board can be easily and massively produced, so the manufacturing costs thereof are greatly reduced. Thus, capital cost of the connector module is also cheaper than that of the conventional design including a printed wiring board and a conventional connector or using an independent complicated connector. Especially, with respect to a unique interface for connectors with unique specifications, the conventional design requires extra costs for remaking a model; however, the connector module of the invention can be easily modified without remaking models, and thus, saving extra modeling costs.

In addition, the connector module of the invention can be changed by varying layout on the printed wiring board and the pitch, length, and width of the pins to adapt to different interfaces and connectors with special specifications. Thus, application of the connector module of the invention is simple with high flexibility, reducing costs for connectors with special specifications.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A connector module, electrically connecting a motor and an external device, comprising:
   a printed wiring board, comprising at least one circuit line, each of circuit lines comprising a first terminal and a second terminal opposite thereto;

a plurality of pins, each of the pins comprising a first end and a second end opposite thereto; and a supporting portion, acting as a bottom portion of the motor;

wherein the first terminals of the circuit lines are electrically connected to an input port of the motor, the second terminals of the circuit lines are separately and directly connected to the first ends of the pins, the second ends of the pins are electrically connected to the external device, and an edge of the printed wiring board abuts the supporting portion, so that the supporting portion supports the printed wiring board and allows the pins to penetrate therethrough and be positioned thereon.

2. The connector module as claimed in claim 1, wherein the motor comprises a cover with an opening therein, and the input port penetrates the opening of the cover to electrically connect to the external device.

3. The connector module as claimed in claim 2, wherein the printed wiring board is disposed above the opening, and the printed wiring board has a size greater than or equal to a size of the opening.

4. The connector module as claimed in claim 1, wherein the second terminals of the circuit lines and the first ends of the pins are separately connected by welding.

5. The connector module as claimed in claim 1, wherein the second terminals of the circuit lines have positions which are adjustable according to various interfaces.

6. The connector module as claimed in claim 5, wherein pins have a pitch based on the position of the second terminals of the circuit lines.

7. The connector module as claimed in claim 1, wherein the supporting portion comprises an insulating material.

8. The connector module as claimed in claim 1, wherein the motor actuates an indicator of an odometer of a vehicle.

9. A motor, electrically connected to an external device, comprising:

an input port; and a connector module, comprising:

a printed wiring board, comprising at least one circuit line, each of circuit lines comprising a first terminal and a second terminal opposite thereto;

a plurality of pins, each of the pins comprising a first end and a second end opposite thereto; and a supporting portion, acting as a bottom portion of the motor;

wherein the first terminals of the circuit lines are electrically connected to the input port of the motor, the second terminals of the circuit lines are separately and directly connected to the first ends of the pins, the second ends of the pins are electrically connected to the external device, such that the motor is electrically connected to the external device by the connector module, and an edge of the printed wiring board abuts the supporting portion, so that the supporting portion supports the printed wiring board and allows the pins to penetrate therethrough and be positioned thereon.

10. The motor as claimed in claim 9, wherein the motor further comprises a cover with an opening therein, and the input port penetrates the opening of the cover to electrically connect to the external device.

11. The motor as claimed in claim 10, wherein the printed wiring board is disposed above the opening, and the printed wiring board has a size greater than or equal to a size of the opening.

12. The motor as claimed in claim 9, wherein the second terminals of the circuit lines and the first ends of the pins are separately connected by welding.

13. The motor as claimed in claim 9, wherein positions of the second terminals of the circuit lines are adjustable according to various with interfaces.

14. The motor as claimed in claim 13, wherein the adjustable positions of the second terminals of the circuit lines are controlled by a jig, and a pitch between the pins is obtained in accordance with the positions of the second terminals of the circuit lines.

15. The motor as claimed in claim 9, wherein the supporting portion comprises an insulating material.

16. The motor as claimed in claim 9, wherein the motor actuates an indicator of an odometer of a vehicle.

* * * * *